(12) United States Patent
Wu et al.

(10) Patent No.: US 8,524,113 B2
(45) Date of Patent: Sep. 3, 2013

(54) ANODE MATERIAL OF LITHIUM-ION SECONDARY BATTERY AND PREPARATION METHOD THEREOF

(75) Inventors: Yu-Shiang Wu, Siijhih (TW); Shian-Tsung Chou, Siijhih (TW); Po-kun Chen, Siijhih (TW)

(73) Assignee: Long Time Technology Corp., Ltd., Siijhih, Taipei (TW)

( * ) Notice: Subject to any disclaimer, the term of this patent is extended or adjusted under 35 U.S.C. 154(b) by 472 days.

(21) Appl. No.: 12/891,802

(22) Filed: Sep. 27, 2010

(65) Prior Publication Data
US 2012/0074610 A1 Mar. 29, 2012

(51) Int. Cl.
*H01M 4/88* (2006.01)

(52) U.S. Cl.
USPC ............ 252/182.1; 252/500; 264/7; 264/105; 428/407; 429/199; 429/218.1; 429/221

(58) Field of Classification Search
USPC .......... 252/182.1, 500; 264/7, 105; 428/407; 429/221, 199, 218.1
See application file for complete search history.

(56) References Cited

U.S. PATENT DOCUMENTS

| 6,541,156 | B1 * | 4/2003 | Fuse et al. | 429/218.1 |
| 2004/0227264 | A1 * | 11/2004 | Zou et al. | 264/7 |
| 2005/0158550 | A1 * | 7/2005 | Ohta et al. | 428/407 |
| 2010/0075222 | A1 * | 3/2010 | Watanabe | 429/199 |

FOREIGN PATENT DOCUMENTS

CN 1224251 A * 7/1999

* cited by examiner

*Primary Examiner* — Khanh Tuan Nguyen
(74) *Attorney, Agent, or Firm* — Cheng-Ju Chiang (57) ABSTRACT

In an anode material of a lithium-ion secondary battery and its preparation method, a natural graphite, an artificial graphite or both are mixed to form a graphite powder, and the graphite powder is mixed with a resin of a high hard carbon content and processed by a mist spray drying process, and finally added or coated with a special resin material after a carburizing heat treatment takes place to prepare a graphite composite of the anode material of the lithium-ion secondary battery and achieve a smaller surface area of an anode graphite composite of the battery and extended cycle life and capacity.

8 Claims, 6 Drawing Sheets

ANODE MATERIAL OF LITHIUM-ION SECONDARY BATTERY AND PREPARATION METHOD THEREOF

BACKGROUND OF THE INVENTION

1. Field of the Invention

The present invention relates to an anode material of a lithium-ion secondary battery and a preparation method thereof, and more particularly to an anode material of a lithium-ion secondary battery, which is a powder material made by mixing a natural graphite, an artificial graphite or both, and then mixing one or more types of resin solutions of a high hard carbon content to the mixture, and processing the mixture by a mist spray drying process and a carbonization heat treatment, and covering the mixture by a special resin material, as well as a process method of the anode material of the lithium-ion secondary battery.

2. Description of Related Art

In recent years, anode materials of lithium-ion secondary batteries are studied extensively, since there are many existing problems of the lithium metal used as an anode material for lithium batteries, and one of the problems is the dendritic crystal precipitated on the surface of the lithium metal, not only causing a safety concern, but also affecting the cycle life of a battery, or even causing a failure of the battery. Carbon system is one of the most popular applications, and graphite is generally used as an anode material for manufacturing a commercial lithium-ion secondary battery, and graphite can be mainly divided into artificial graphite and natural graphite. For artificial graphite, mesocarbon microbead (MCMB) carbon comes with a complicated manufacturing process and adopts a carbonization furnace for its processing, and thus the artificial graphite incurs a high production cost. For natural graphite, a greater irreversible capacity at the first cycle generally occurs in the process of charging or discharging a battery, and a surface modification is generally used at present to overcome such shortcoming, wherein a carbon containing layer is coated onto the surface of the graphite, and a carbonization heat treatment is conducted to form an amorphous carbon material, and this layer of amorphous carbon material can suppress lithium complexes from being inserted between the graphite layers to reduce the irreversible capacity. Although the way of coating a pitch onto the surface of graphite provides a smaller specific surface area, a less first irreversibility, a higher quality of the anode material of graphite, a better compatibility with electrolyte solutions, and a lower cost, yet the capacity is reduced with the number of times of charges and discharges, and thus causing a shorter cycle life. For example, an oxidation treatment of graphite as disclosed in Japan Patent Publication No. 2000-261046 changes the status of the surface of graphite to improve the compatibility of an anode material with an electrolyte solution, yet its capacity is lower than the capacity of pure natural graphite. As disclosed in P.R.C. Patent Publication Nos. CN1224251A and CN1304187A, ethanol or an equivalent solvent is used for dissolving a resin of a high hard carbon content such as furan resin, polyacrylonitrile resin, phenolic resin, urea resin, epoxy resin, polyester resin, polyamide resin and melamine resin to coat the graphite, but such method has the drawbacks of a too-large specific surface area, so that the coated graphite particles may be stuck together to form lumps, and the graphite lumps will cause a peel-off or damage of the coated layer after the grinding process takes place and affect the performance of the anode material.

Based on the study of the aforementioned methods of adopting a resin of a high hard carbon content to change the status of the surface of natural graphite, the first irreversibility can be reduced, and a better capacity retention can be achieved in a charge/discharge cycle, and the amorphous carbon coating can suppress lithium complexes from being inserted between into the graphite layers to reduce the irreversible capacity and retard the charge/discharge latency. From the study, it is found that natural graphite comes with a sheet structure, such that the insertion and extraction of the lithium ions are restricted by the crystal boundary of the graphite, and a lower quick charge/discharge performance is resulted. Furthermore, there are still many crevices on the surface coated with amorphous carbon, and thus resulting in a too-large specific surface area of the graphite.

SUMMARY OF THE INVENTION

In view of the shortcomings the conventional multi-state carbon materials used as an anode material of a lithium-ion secondary battery including a high cost of graphitized carbon and a complicated manufacturing process, and the fast growing demands for 3C electronic products, electric hand tools, and electric cars, the inventor of the present invention based on years of experience in the related field to conduct extensive researches and experiments, and finally developed an anode material of the lithium-ion secondary battery and its preparation method in accordance with the present invention.

Therefore, it is a primary objective of the present invention is to provide and mix an artificial graphite, a natural graphite or both, and manufacture an anode material of a lithium-ion secondary battery by a special manufacturing process.

Another objective of the present invention is to provide a preparation method of an anode material of a lithium-ion secondary battery.

To achieve the foregoing objectives, the present invention adopts the following technical measures and provides an anode material of a lithium-ion secondary battery manufactured by a method comprising the steps of: mixing a natural graphite, an artificial graphite or both to form a graphite powder; mixing the graphite powder with a resin of a high hard carbon content; processing the mixture by a mist spray drying process and a carbonization heat treatment; adding a special resin material to prepare a graphite composite for the anode material of the lithium-ion secondary battery.

In a preferred embodiment of the present invention, the resin of the high hard carbon content is selected from the collection of a furan resin, a polyacrylonitrile resin, a phenolic resin, a urea resin, an epoxy resin, a polyester resin, a polyamide resin and a melamine resin.

In a preferred embodiment of the present invention, the graphite powder is obtained from either the natural graphite or the artificial graphite and sieved, grinded, and compounded into a power with grain diameter of 5~30 μm.

To achieve the aforementioned objectives, the present invention adopts the following technical measures and provides a preparation method of an anode material of a lithium-ion secondary battery, and the method comprises the steps of: mixing a natural graphite, an artificial graphite or both to form a graphite powder; mixing the graphite powder with a resin of a high hard carbon content into a paste, and processed by mist spray drying process to form a powder, and putting the powder into a carbonization furnace for a heat treatment; passing nitrogen gas ($N_2$) into the carbonization furnace to provide protection environment during the heat treatment, wherein the temperature required for the heat treatment rises to 800~1400° C., preferably 900~1200° C., and the temperature rising time is 1~10° C./min, and the temperature holding time is 1~5 hr, and removing the powder after the heat treatment is completed; and adding, blending and mixing the powder into special resin solution, and heating and drying the solution to obtain a graphite composite powder used as the anode material of the lithium-ion secondary battery.

In a preferred embodiment of the present invention, the resin of the high hard carbon content is selected from the collection of a furan resin, a polyacrylonitrile resin, a phenolic resin, a urea resin, an epoxy resin, a polyester resin, a polyamide resin.

In a preferred embodiment of the present invention, the resin of the high hard carbon content is selected from the collection of a furan resin, a polyacrylonitrile resin, a phenolic resin, a urea resin, an epoxy resin, a polyester resin, a polyamide resin and a melamine resin.

In a preferred embodiment of the present invention, the resin of the high hard carbon content has a solid content equal to 3~25 wt % of the graphite composite material.

In a preferred embodiment of the present invention, the special resin is selected from the collection of a polyaniline, a polyphenylene sulfide, a polypyrrole, a PEDOT-POSS, a polyacetylene, a poly(sulfurnitride), and a poly(alkylamine).

In a preferred embodiment of the present invention, the special resin solution occupies a content equal to 0.1~20 wt % of the graphite composite material.

In a preferred embodiment of the present invention, the step of adding the special resin solution includes blending and mixing the special resin solution at a heating and drying temperature of 100~200° C. and a drying time of 30~120 minutes.

BRIEF DESCRIPTION OF THE DRAWINGS

The invention, as well as its many advantages, may be further understood by the following detailed description and drawings in which.

DETAILED DESCRIPTION OF THE INVENTION

In an anode material of a lithium-ion secondary battery and its preparation method in accordance with the present invention, a natural graphite, an artificial graphite or both are mixed to produce a base material with a grain diameter controlled within 5~30 μm, and 3~25 wt %, and a resin of a high hard carbon content and the base material are mixed to form a paste, and the paste is processed by a mist spray drying process to produce a uniformly coated powder, and the powder is processed by a carbonization heat treatment at a temperature of 800~1400° C., and then cooled and removed, and finally stirred, mixed and dried in a special resin solution to obtain the surface-modified anode material, so as to overcome the shortcomings of the conventional multi-state carbon materials (such as natural graphite, charcoal, carbon fiber, and MCMB carbon) with a low charge/discharge rate, a low capacity, and a high price.

Figure 1:
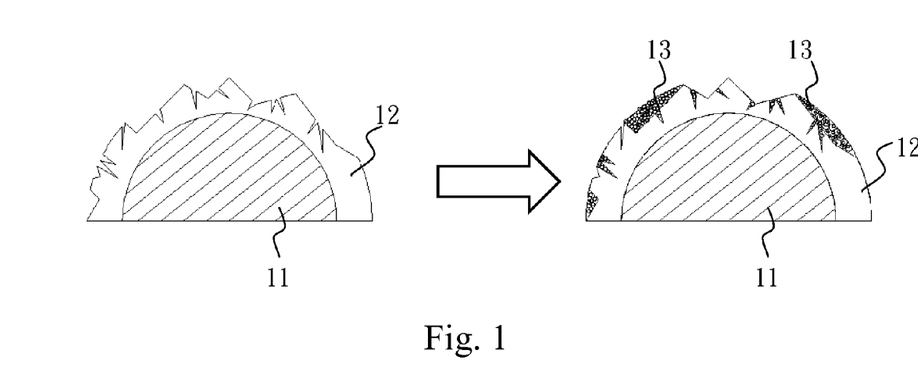
FIG. 1 is a schematic view of a graphite composite added with a special resin in accordance with the present invention.

With reference to FIG. 1 for a schematic view of a graphite composite added with a special resin in accordance with the present invention, a graphite material 11 and one or more types of polymer resins 12 with a high hard carbon content are mixed into a paste, and then the paste is processed by a mist spray drying process to produce anode material which is a resin coated onto the graphite, and carburized by a heat treatment, and added with a special resin 13 such as a polyaniline to coat the polymer material onto a surface of amorphous carbon to fix and fill surface micro-holes, and the graphite material 11 is covered by the amorphous carbon and the special resin 13 completely, such that the surface of the graphite composite becomes flat without crevices, and the specific surface area is reduced significantly, and the charge/discharge performance of the lithium-ion secondary battery is improved, and the lithium ions can be inserted and extracted quickly to provide a more stable reaction with the electrolyte solution, and a better charge/discharge cycle performance, and such product can be used as an anode material of a lithium-ion secondary battery.

Figure 2:
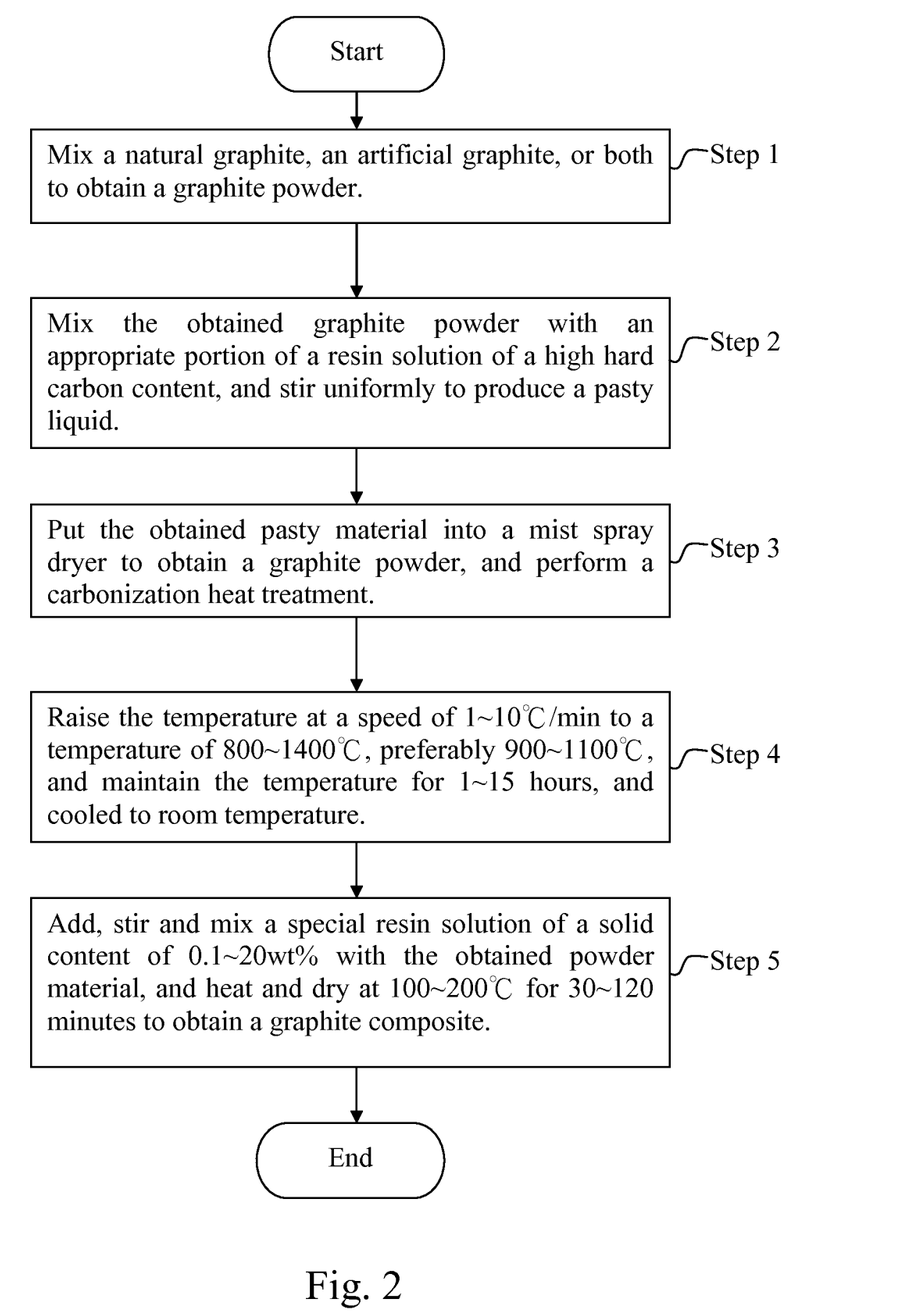
FIG. 2 is a flow chart of preparing a graphite composite in accordance with the present invention.

With reference FIG. 2 for a flow chart of preparing a graphite composite in accordance with the present invention, the method of preparing the graphite composite comprises the following steps:

In Step 1, a natural graphite, an artificial graphite, or both are mixed into a graphite powder, and the graphite powder is sieved and grinded, and the grain diameter is controlled within 5~30 μm.

In Step 2, the graphite powder obtained from Step 1 is mixed with an appropriate portion of a solvent (which is a resin solution of a high hard carbon content in this preferred embodiment) and stirred uniformly into a pasty liquid. The solvent resin is removed by blending and heating before it is put into a mist spray dryer for performing the mist spray drying process.

In Step 3, the pasty material obtained from Step 2 is put into the mist spray dryer to produce graphite powder with a grain diameter of 10~35 μm, and then the graphite powder is processed by a carbonization heat treatment.

In Step 4, the temperature rises at a speed of 1~10° C./min to a temperature of 800~1400° C., preferably 900~1100° C. required by the heat treatment, and the temperature is maintained for 1~15 hours, and then cooled to room temperature during the heat treatment.

In Step 5, the powder material obtained from Step 4 is added and mixed with a special resin solution with a solid content of 0.1~20 wt %, and then heated and dried at 100~200° C. for 30~120 minutes to obtain a graphite composite of the present invention, and the graphite composite is used as an anode material of a lithium-ion secondary battery.

The polymer resin 12 of the high hard carbon content is a resin selected from the collection of a furan resin, a polyacrylonitrile resin, a phenolic resin, a urea resin, an epoxy resin, a polyester resin, a polyamide resin and a melamine resin.

The special resin 13 is one selected from the collection of a polyaniline, a polyphenylene sulfide, a polypyrrole, a PEDOT, a polyacetylene, a poly(sulfurnitride) and a poly(alkylamine).

TABLE 1-1

Comparison of Manufacturing Conditions and Specific Surface Area between Samples A1 and A2

| Sample | Sieving and Grinding | Coated Resin with High Hard Carbon Content (furan resin) | Mist Spray Drying | Carbonization Heat Treatment | Polypyrrole Liquid | Specific Surface Area ($m^2g^{-1}$) |
|---|---|---|---|---|---|---|
| A1 | Yes | 8 wt % | Yes | Yes | Not added | 20.41 |
| A2 | Yes | 8 wt % | Yes | Yes | 5 wt % | 2.85 |

TABLE 1-2

Comparison of Manufacturing Conditions and Specific Surface Area between Samples B1 and B2

| Sample | Sieving and Grinding | Coated Resin with High Hard Carbon Content (polyamide resin) | Mist Spray Drying | Carbonization Heat Treatment | Polyaniline Liquid | Specific Surface Area ($m^2g^{-1}$) |
|---|---|---|---|---|---|---|
| B1 | Yes | 8 wt % | Yes | Yes | Not added | 28.50 |
| B2 | Yes | 8 wt % | Yes | Yes | 5 wt % | 3.15 |

With reference to Table 1-1 and Table 1-2, after the mist spray drying process and the carbonization heat treatment take place, the graphite composites A2, B2 with 5 wt % of the special resin 13 (such as polypyrrole liquid and polyaniline liquid) have specific surface areas of 2.85 $m^2g^{-1}$ and 3.15 $m^2g^{-1}$ respectively, which are much smaller than the specific surface areas of 20.41 $m^2g^{-1}$, 28.50 $m^2g^{-1}$ of the graphite composites A1, B1 processed by the mist spray drying process but without adding the special resin 13. The graphite materials 11 of the graphite composites A1, B1 without adding the special resin 13 are grinded and mixed with 8 wt % furan resin, and 8 wt % polyamide resin respectively, and then processed by a mist spray drying process, and a layer of resin is coated on the surface of the graphite, and finally a carbonization heat treatment is conducted to produce the required graphite composite. However, instruments for measuring the specific surface area shows that the specific surface area is relatively large and equal to 20.41~28.50 $m^2g^{-1}$. Although a layer of resin is coated onto the graphite, some substances inside the resin and graphite are released after the carbonization heat treatment takes place, and the resin is heated at a specific temperature for a specific time, such that holes and crevices are formed on the surface of the composite material of the graphite resin, and the specific surface area becomes too large. After the graphite composites A2, B2 are mixed with a graphite resin and processed by a mist spray drying process and a carbonization heat treatment, and added with a graphite composite of the special resin 13, the instrument for measuring the specific surface area shows that the specific surface area is equal to 2.85~3.15 $m^2g^{-1}$, since the special resin 13 can be coated to cover the surface of graphite completely by the mist spray drying process, such that micro-holes may be formed on the surface of the graphite after the heat treatment takes place, and the specific surface area is increased. With the addition of a special resin of an appropriate proportion, the crevices can be fixed and filled, and the pits, holes, crevices on the surface of the powder can be reduced to provide a complete structure and reduce the specific surface area effectively.

A preferred embodiment is provided for illustrating the powder of the graphite composite A1, A2, B1, B2 used as an anode material for coating a lithium-ion battery anode and the assembling of the battery as follows.

Coating an Anode Material of a Battery Anode:

1. A trace (0.1 wt %) of oxalic acid and 10 wt % of polyvinylidene fluoride (PVDF) binder are mixed into a N-methylpyrrolidone (NMP) solvent and stirred uniformly for 20 minutes, such that the PVDF can be distributed into the mixed liquid of the solvent uniformly.

2. Put the powder of the graphite composite A1, A2, B1, B2 into the uniform mixed solution, and stir the solution for 20 minutes.

3. Coat a pasty substance formed by the mixed solution onto a copper foil uniformly by a 130 μm scraper, and bake dry the pasty substance at 100° C. to remove remained solvent, and roll press the dried substance by a roll press rate of 25%, and then bake dry the substance at 150° C.

Assembling a Battery:

1. A coated anode plate is cut into a circular plate with a diameter of 13 mm, and a lithium foil is used as a cathode plate.

2. Assemble components of a coin-type battery sequentially in a control room at a dry environment, and add an electrolyte solution including 1M of lithium hexafluorophosphate ($LiPF_6$), and a solute (ethylene carbonate, EC) and a solvent (ethyl methyl carbonate, EMC) having volumes in the ratio of 1:2 to complete assembling the coin-type battery.

3 Perform a charge/discharge performance test of the coin-type battery, wherein a charge/discharge rate of 0.2 C, and a constant current density are used for charges/discharges for 50 times, and the charge cutoff voltage is equal to 2V (vs. Li/Li$^+$), and the discharge cutoff voltage is equal to 0.005V (vs. Li/Li$^+$).

Figure 3:
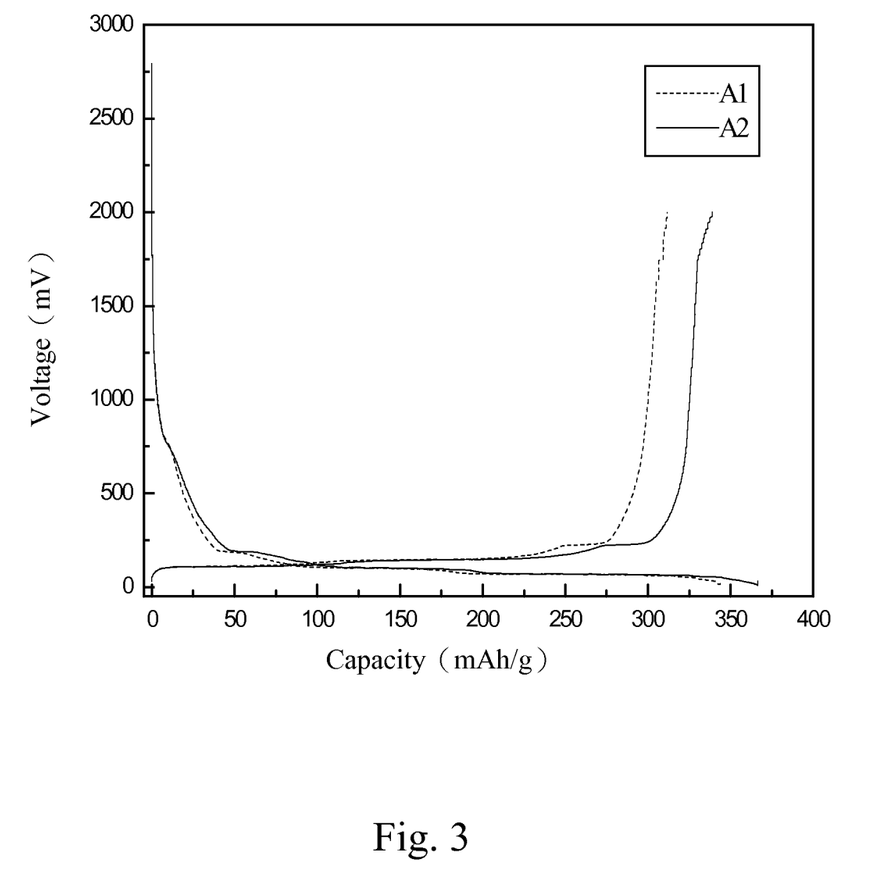
FIG. 3 is a graph of voltage versus first charging/discharging capacity at the first time of graphite composites A1, A2 in accordance with the present invention.
Figure 4:
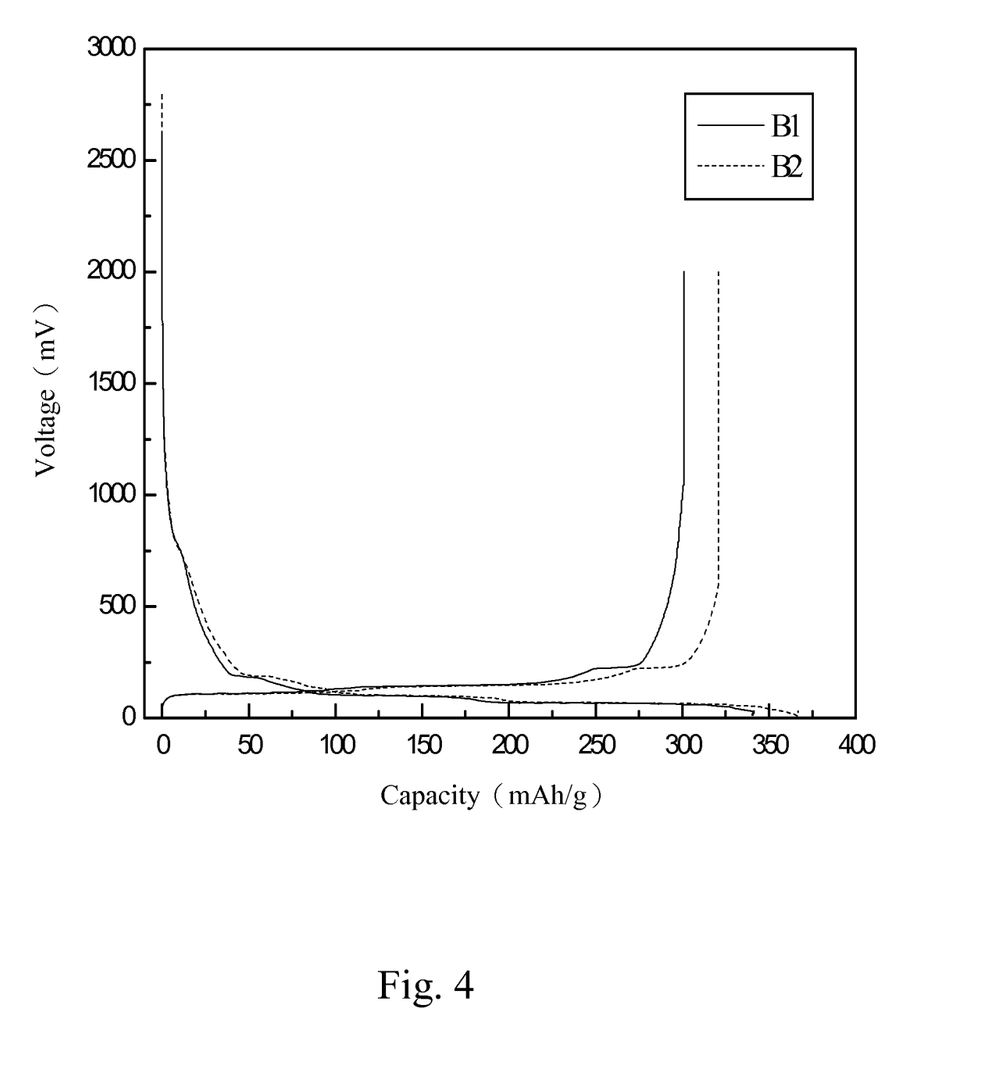
FIG. 4 is a graph of voltage versus first charging/discharging capacity of at first time of graphite composites B1, B2 in accordance with the present invention.

With reference to FIG. 3 and FIG. 4, the first charge capacities of A1, A2 are 344 mAh/g and 365 mAh/g respectively, the first discharge capacities of A1, A2 are 311 mAh/g and 338 mAh/g respectively, the first charge capacities of B1, B2 are 341 mAh/g and 350 mAh/g respectively, and the first discharge capacities of B1, B2 are 300 mAh/g and 320 mAh/g respectively. In the first-time charge/discharge irreversible capacities, it is found that the irreversible capacities of the graphite composites A1, B1 are greater than 33 mAh/g and 41 mAh/g respectively, and he irreversible capacities of the graphite composites A2, B2 processed by the added special resin 13 are reduced to 28 mAh/g and 30 mAh/g respectively as shown in Table 2-1 and Table 2-2 below.

TABLE 2-1

Comparison of electrochemical properties of Samples A1 and A2

| Sample | First Charge Capacity (mAh/g) | First Discharge Capacity (mAh/g) | First Charge/Discharge Irreversible Capacity (mAh/g) | First Charge/ Discharge Irreversibility (%) | Columbic Efficiency of the $50^{th}$ Cycle (%) |
|---|---|---|---|---|---|
| A1 | 344 | 311 | 33 | 11 | 88 |
| A2 | 366 | 338 | 28 | 8 | 98 |

TABLE 2-2

Comparison of electrochemical properties of Samples B1 and B2

| Sample | First Charge Capacity (mAh/g) | First Discharge Capacity (mAh/g) | First Charge/Discharge Irreversible Capacity (mAh/g) | First Charge/ Discharge Irreversibility (%) | Columbic Efficiency of the $50^{th}$ Cycle (%) |
|---|---|---|---|---|---|
| B1 | 341 | 300 | 41 | 13 | 85 |
| B2 | 350 | 320 | 30 | 9 | 95 |

In addition, the graphite composite A1, B1 is formed by mixing the graphite material 11 with the polymer resin 12 uniformly and conducting the mist spray drying process and the carbonization heat treatment. There are many micro-holes formed on the surface of the graphite composite A1, B1, such that the specific surface area is too large, and the graphite composites A2, B2 show that the too-large specific surface area causes a too-large first irreversibility.

Figure 5:
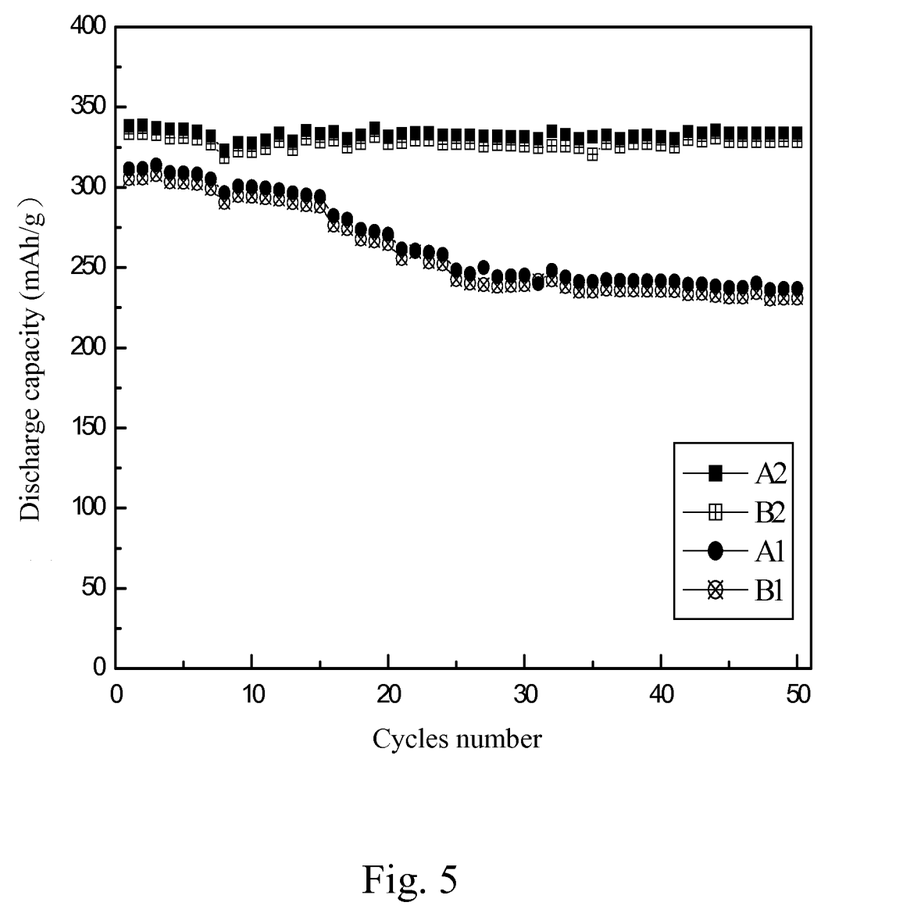
FIG. 5 is a graph of discharging capacity versus cycle number (50 cycles) of graphite composites A1, A2, B1, B2 in accordance with the present invention.

With reference to FIG. 5 for a graph of discharging capacity versus cycle number (50 cycles) of graphite composites A1, A2, B1, B2 in accordance with the present invention, lithium ions will be chemically reacted with an electrolyte solution in a lithium ion during a charge/discharge process, and a solid electrolyte interface (SEI) film is formed on a surface of the graphite material 11 to increase the irreversible capacity of the lithium-ion secondary battery. Although the surface of the graphite composite A1, B1 is covered by a resin to retard the formation of the SEI film, yet there are many micro-holes and small crevices on the surface, such that once the cycle number of charge/discharge increases, the graphite layer will start falling off or separating from the graphite composite A1, B1, and the cycle stability will be affected adversely. Furthermore, a too-large specific surface area will result in a higher first irreversibility. The graphite composites A2, B2 are added with the special resin 13 respectively, and the special resin 13 can fix and fill the micro-holes of the amorphous carbon formed on the surface of the original graphite and processed by the carbonization heat treatment to retard the formation of the SEI film. In addition, the special resin 13 is a material with a low resistance and a high elasticity, not only can improve the electric conductivity of the graphite material 11 and the polymer resin 12, but also provides a higher efficiency for inserting and extracting the lithium ions freely. Therefore, the graphite composites A2, B2 have a higher capacity and a better cycle stability.

Figure 6:
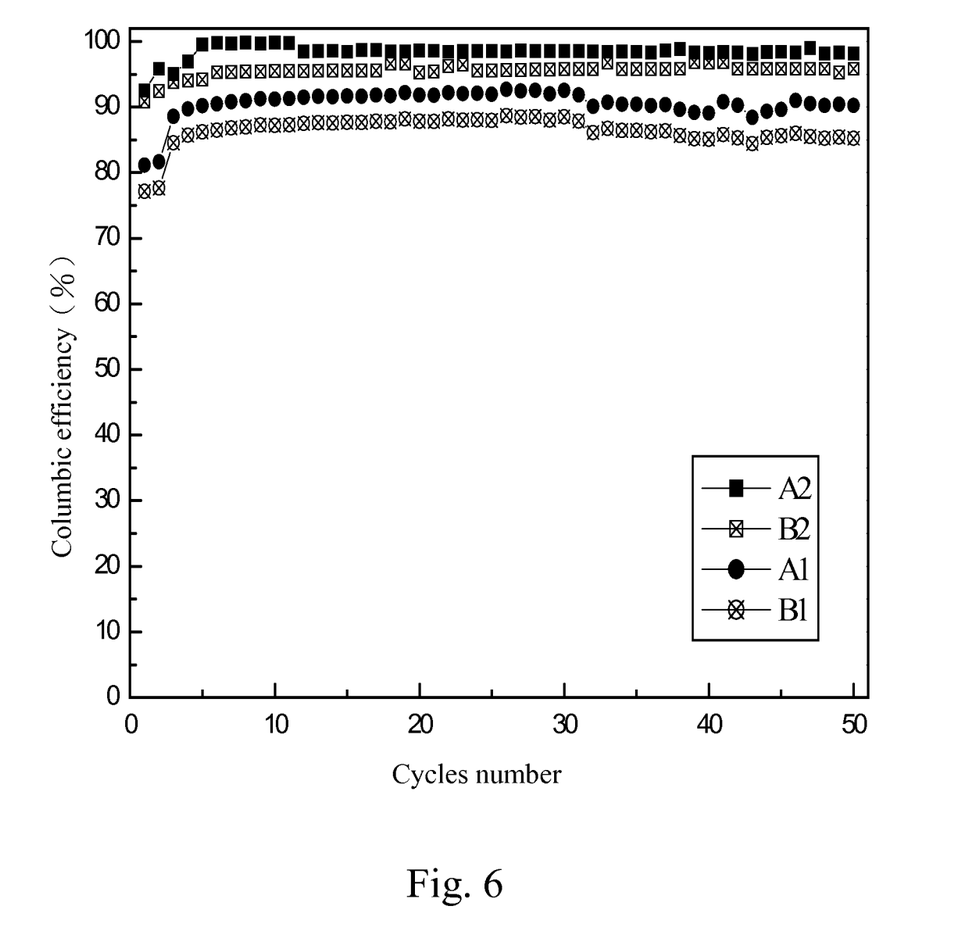
FIG. 6 is a graph of columbic efficiency versus cycle number (50 cycles) of graphite composites A1, A2, B1, B2 in accordance with the present invention.

With reference to FIG. 6 for a graph of columbic efficiency versus cycle number (50 cycles) of graphite composites A1, A2, B1, B2 in accordance with the present invention, the columbic efficiencies of the graphite composites A1, B1 at the first cycle are smaller than those of the graphite composites A2, B2, and after 50 cycles, the capacity retentions of A2, B2 are greater than those of A1, B1. Therefore, it is obvious that the result is caused by the effect of adding the special resin 12 to the graphite composites A2, B2 after the heat treatment takes place. In addition to fixing and filling the crevices on the surface of the graphite composites, the special resin 12 can also reduce the specific surface area of the graphite composites, and the special resin with a low resistance can insert or extract lithium ions more smoothly. The special resin 13 is provided for retarding the formation of the SEI film, so that very high cycle stability and capacity retention can be achieved, and the columbic efficiency for the $50^{th}$ cycle can reach up to 98%~95%.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An anode material of a lithium-ion secondary battery, comprising a graphite powder mixed from a natural graphite, an artificial graphite or both, a first resin having a hard carbon content therein and mixed with the graphite powder by a mist spray drying process, and a second resin material further mixed with the mixed graphite powder and the first resin after a carbonization heat treatment on the mixed graphite powder and the first resin takes place to prepare a graphite composite of the anode material of the lithium-ion secondary battery;

wherein the first resin is one selected from the collection of an urea resin, a polyester resin, a polyamide resin and a melamine resin.

2. The anode material of the lithium-ion secondary battery of claim 1, wherein the graphite powder is obtained from either the natural graphite or the artificial graphite and sieved, grinded, and compounded into a power with grain diameter of 5~30 μm.

3. The anode material of the lithium-ion secondary battery of claim 1, wherein the second resin is one selected from the collection of a polyphenylene sulfide, a polypyrrole, a PEDOT-POSS, a polyacetylene, a poly(sulfurnitride), and a poly(alkylamine).

4. A preparation method of an anode material of a lithium-ion secondary battery, comprising the steps of:

mixing a natural graphite, an artificial graphite or both to form a graphite powder;

mixing the graphite powder with a first resin of a hard carbon content into a paste, and processed by a mist spray drying process to form a powder, and putting the powder into a carbonization furnace for a heat treatment;

passing nitrogen gas (N2) into the carbonization furnace to provide a protection environment during the heat treatment, wherein the temperature required for the heat treatment rises to 900~1200° C., and the temperature rising time is 1~10° C./min, and the temperature holding time is 1~5 hr, and removing the powder after the heat treatment is completed; and adding, blending and mixing the powder into a second resin solution, and heating and drying the solution at a heating and drying temperature of 100~200° C. and a drying time of 30~120 minutes to obtain a graphite composite powder used as the anode material of the lithium-ion secondary battery.

5. The preparation method of claim 4, wherein the first resin is one selected from the collection of an urea resin, a polyester resin, a polyamide resin and a melamine resin.

6. The preparation method of claim 5, wherein the first resin has a solid content equal to 3~25 wt % of the graphite composite material.

7. The preparation method of claim 4, wherein the second resin is one selected from the collection of a polyphenylene sulfide, a polypyrrole, a PEDOT-POSS, a polyacetylene, a poly(sulfurnitride), and a poly(alkylamine).

8. The preparation method of claim 7, wherein the second resin solution occupies a content equal to 0.1~20 wt % of the graphite composite material.

\* \* \* \* \*